United States Patent
Sokolov et al.

(10) Patent No.: US 11,019,085 B1
(45) Date of Patent: May 25, 2021

(54) SYSTEMS AND METHODS FOR IDENTIFYING POTENTIALLY RISKY TRAFFIC DESTINED FOR NETWORK-CONNECTED DEVICES

(71) Applicant: Symantec Corporation, Mountain View, CA (US)

(72) Inventors: Ilya Sokolov, Boston, MA (US); Bruce McCorkendale, Manhattan Beach, CA (US)

(*) Notice: Subject to any disclaimer, the term of this patent is extended or adjusted under 35 U.S.C. 154(b) by 102 days.

(21) Appl. No.: 16/222,385

(22) Filed: Dec. 17, 2018

(51) Int. Cl.
*H04L 29/06* (2006.01)
*G06F 21/56* (2013.01)

(52) U.S. Cl.
CPC ........ *H04L 63/1425* (2013.01); *G06F 21/566* (2013.01); *H04L 63/1416* (2013.01); *H04L 63/1491* (2013.01)

(58) Field of Classification Search
CPC ............... G06F 21/566; H04L 63/1491; H04L 63/1425; H04L 63/1416
See application file for complete search history.

(56) References Cited

U.S. PATENT DOCUMENTS

| | | | | |
|---|---|---|---|---|
| 8,806,646 B1* | 8/2014 | Daswani | ............. | H04L 63/1425 713/161 |
| 10,055,591 B1* | 8/2018 | Sharifi Mehr | .......... | G06F 21/31 |
| 10,360,052 B1* | 7/2019 | Zander | ................ | G06F 9/44505 |
| 2008/0005782 A1* | 1/2008 | Aziz | ................... | H04L 63/1425 726/3 |
| 2011/0321166 A1* | 12/2011 | Capalik | ............... | H04L 63/1416 726/25 |
| 2017/0289176 A1* | 10/2017 | Chen | .................... | H04L 63/1416 |
| 2018/0081666 A1* | 3/2018 | Surdu | .................... | G06F 21/572 |
| 2018/0097651 A1 | 4/2018 | Guedalia et al. | | |
| 2018/0103044 A1* | 4/2018 | Malinowski | .......... | G06F 21/566 |
| 2018/0260574 A1* | 9/2018 | Morello | ............. | G06F 9/44505 |
| 2019/0068642 A1* | 2/2019 | Araujo | .................. | G06F 21/567 |
| 2020/0092165 A1* | 3/2020 | Sellers | ................ | H04L 63/1491 |

(Continued)

OTHER PUBLICATIONS

Soliman et al., "Taxonomy of Malware Analysis in the IoT", pp. 519-529 (Year: 2017).*

(Continued)

*Primary Examiner* — Thaddeus J Plecha
(74) *Attorney, Agent, or Firm* — FisherBroyles, LLP

(57) ABSTRACT

The disclosed computer-implemented method for identifying potentially risky traffic destined for network-connected devices may include (1) receiving, at a cloud-based server, characteristics of a network-connected device being adding to a network, (2) creating a digital virtual image of the network-connected device on the cloud-based server, (3) receiving a request sent to a port on the network-connected device and (4) performing a security action including (A) sending the request to the digital virtual image of the network-connected device, (B) identifying the request as a potentially risky request by monitoring a runtime reaction of the digital virtual image of the network-connected device to the request, and (C) sending, to a network monitoring device, a message indicating the request is a potentially risky request. Various other methods, systems, and computer-readable media are also disclosed.

20 Claims, 6 Drawing Sheets

(56) References Cited

U.S. PATENT DOCUMENTS

2020/0162500 A1* 5/2020 Ciocarlie ............... H04L 63/20

OTHER PUBLICATIONS

Soliman et al., "Taxonomy of Malware Analysis in the IoT", 2017 12th International Conference on Computer Engineering and Systems (ICCES), Dec. 2017, pp. 519-529 (Year: 2017).*
Fan et al., "Enabling an Anatomic View to Investigate Honeypot Systems: A Survey", IEEE Systems Journal, vol. 12, No. 4, Dec. 2018, pp. 1-14.
"Symantec Web Isolation", URL: https://www.symantec.com/products/web-isolation, Jan. 2019, 8 pages.

* cited by examiner

SYSTEMS AND METHODS FOR IDENTIFYING POTENTIALLY RISKY TRAFFIC DESTINED FOR NETWORK-CONNECTED DEVICES

BACKGROUND

Smart homes and their constituent smart devices, such as Internet of Things devices, are becoming more and more pervasive. These devices may include smart thermostats, bulbs, wearable devices, etc., and may be interconnected to form local ad hoc networks (i.e., local smart home ecosystems) where they may work together to solve specific problems (e.g., ordering groceries online when a smart refrigerator is low on food, turning off lights when people leave the premises, adjusting air temperature in a smart home when people leave the premises, etc.). New smart devices may be introduced into these ad hoc networks, and as a result, anti-malware systems may need to evolve and adapt to actively defend smart homes to ever-changing threats to vulnerabilities of smart devices.

Protecting the vulnerabilities of various types of smart devices may be challenging for traditional security systems because conventional security techniques may render the smart devices useless and/or may reduce functionality of the smart devices. In response, users of the smart devices may turn security features off, leaving their devices exposed to malware attacks. For example, an expensive smart television running outdated programming may have its ports blocked, thus rendering the smart television unable to receive digital video from the Internet. A user of the smart television may disable security features of the television and/or an anti-malware device, thus leaving the smart television vulnerable to malware attacks from the Internet. The instant disclosure, therefore, identifies and addresses a need for systems and methods for identifying potentially risky traffic destined for network-connected devices.

SUMMARY

As will be described in greater detail below, the instant disclosure describes various systems and methods for identifying potentially risky traffic destined for network-connected devices.

In one example, a method for identifying potentially risky traffic destined for network-connected devices may include (1) receiving, at a cloud-based server, characteristics of a network-connected device being adding to a network, (2) creating a digital virtual image of the network-connected device on the cloud-based server, (3) receiving a request sent to a port on the network-connected device and (4) performing a security action including (A) sending the request to the digital virtual image of the network-connected device, (B) identifying the request as a potentially risky request by monitoring a runtime reaction of the digital virtual image of the network-connected device to the request, and (C) sending, to a network monitoring device, a message indicating the request may be a potentially risky request.

In one example, the network-connected device may be an Internet-of-Things device. In one embodiment, the network may be at least in part an Internet-of-Things network. In some examples, the network monitoring device may be a network router.

In some embodiments, the method may include (1) detecting, by the network monitoring device, the characteristics of the network-connected device upon adding the network-connected device to the network, (2) sending the characteristics from the network monitoring device to the cloud-based server, (3) intercepting and quarantining, by the network monitoring device, the request sent to the port on the network-connected device, and (4) sending the request from the network monitoring device to the cloud-based server. In one example, detecting may include (1) scanning open ports on the network and (2) detecting a type of computer-readable instructions stored on the network-connected device. In one embodiment, the method may include detecting a version identifier of the computer-readable instructions and a revision identifier of the computer-readable instructions.

In some examples, (1) the digital virtual image of the network-connected device may include at least some of the same computer-readable instructions stored on the network-connected device and/or (2) the computer-readable instructions may be configured to monitor the port on the network-connected device. In some embodiments, the digital virtual image of the network-connected device may include the same version and revision of the type of computer-readable instructions stored on the network-connected device.

In one example, creating the digital virtual image of the network-connected device at the cloud-based server may include running firmware of the network-connected device in a virtual environment.

In one embodiment, receiving the request may be triggered by at least one of (1) the request originating from a suspicious source, (2) the request being novel for a type of the network-connected device, and/or (3) the request specifically targeting the network-connected device.

In some examples, receiving the request may include decrypting the request.

In some embodiments, the runtime reaction of the digital virtual image of the network-connected device to the request comprises at least one of (1) a service crash, (2) a service hang, (3) a return of a server error status code, (4) a redirection of network traffic to another device, and/or (5) an unanticipated response.

In one example, the method may include resetting the digital virtual image of the network-connected device following sending the message.

In one embodiment, the method may include blocking the potentially risky request from reaching at least one device in the network.

In one embodiment, a system for identifying potentially risky traffic destined for network-connected devices may include at least one physical processor at a cloud-based server and physical memory that includes computer-executable instructions that, when executed by the physical processor, cause the physical processor to (1) receive, at the cloud-based server, characteristics of a network-connected device being adding to a network, (2) create a digital virtual image of the network-connected device on the cloud-based server, (3) receive a request sent to a port on the network-connected device, and (4) perform a security action including (A) sending the request to the digital virtual image of the network-connected device, (B) identifying the request as a potentially risky request by monitoring a runtime reaction of the digital virtual image of the network-connected device to the request, and (C) sending, to a network monitoring device, a message indicating the request may be a potentially risky request.

In some examples, the above-described method may be encoded as computer-readable instructions on a non-transitory computer-readable medium. For example, a computer-readable medium may include one or more computer-executable instructions that, when executed by at least one processor of a cloud-based server computing device, may cause the a cloud-based server computing device to (1) receive, at the cloud-based server, characteristics of a network-connected device being adding to a network, (2) create a digital virtual image of the network-connected device on the cloud-based server, (3) receive a request sent to a port on the network-connected device, and (4) perform a security action including (A) sending the request to the digital virtual image of the network-connected device, (B) identifying the request as a potentially risky request by monitoring a runtime reaction of the digital virtual image of the network-connected device to the request, and (C) sending, to a network monitoring device, a message indicating the request may be a potentially risky request.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
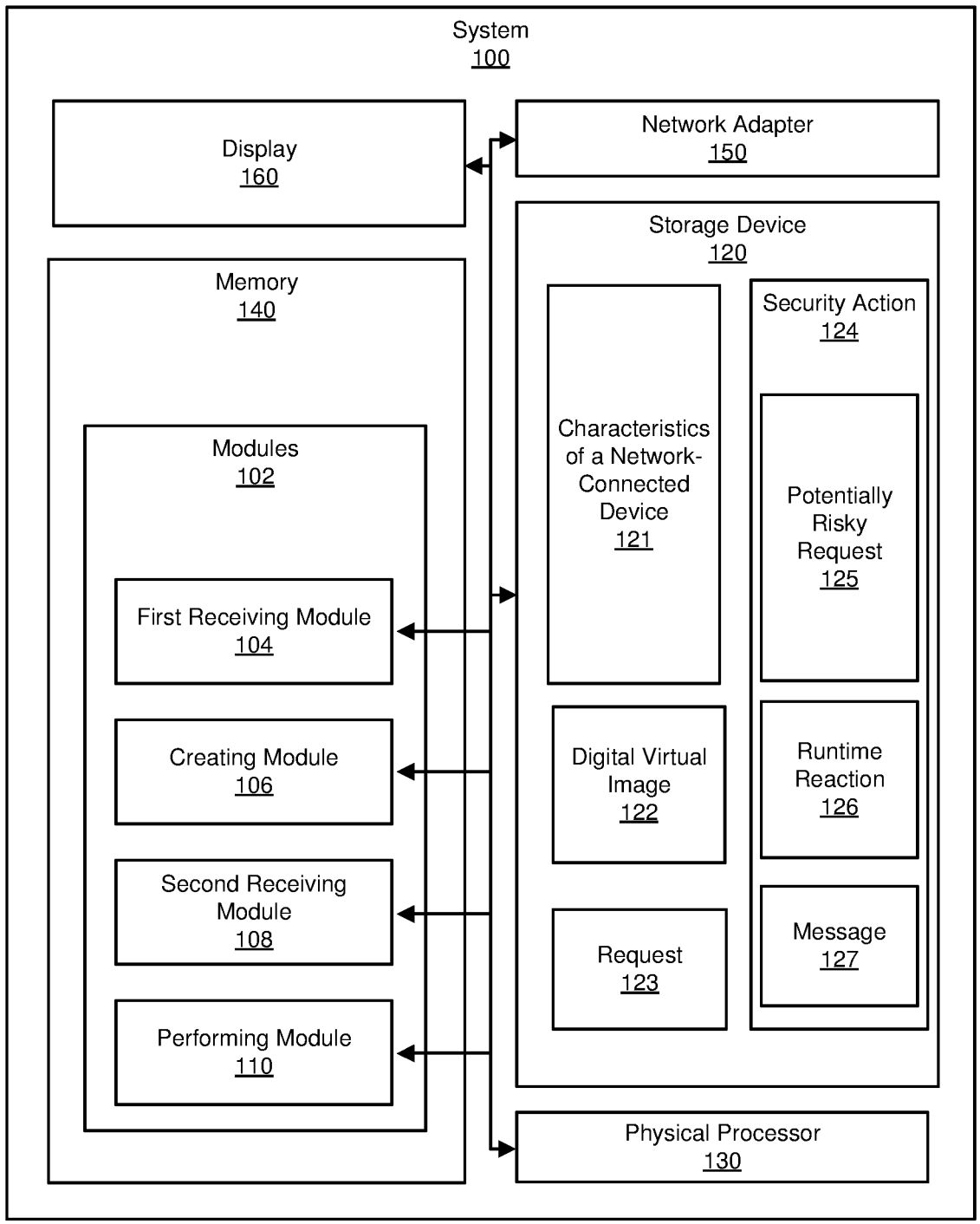
FIG. 1 is a block diagram of an example system for identifying potentially risky traffic destined for network-connected devices.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for identifying potentially risky traffic destined for network-connected devices. As will be explained in greater detail below, in some examples the systems described herein may perform runtime modelling of Internet-of-Things (IoT) devices at a cloud-based server to identify potentially risky network traffic destined for the IoT devices.

Many network-connected devices, such as smart devices and IoT devices, expose ports for communicating with applications such as mobile applications running on other computing devices via local networks (e.g., an IoT network). Typically, these ports may be blocked from external access (e.g., out of local network access). For example, CHROMECAST allows streaming of video content from mobile devices and/or computers via local wireless networks (e.g., WiFi networks) to CHROMECAST-enabled televisions. Similarly, mobile applications may control IoT smart plugs via direct Transmission Control Protocol (TCP) connections. Programming of the network-connected devices that monitor (i.e., "listen") to these ports may be vulnerable to malicious activities. For example, when the network-connected devices execute old and vulnerable versions of APACHE Web Server software monitoring port 80, the network-connected devices may be vulnerable to malicious activities. In response to identifying vulnerabilities, these ports may be completely blocked, may be accessed without restriction, and/or the vulnerabilities may be mitigated with responses falling between complete blocking and full access.

By doing so, the systems and methods described herein may improve functioning of a computing device and/or provide targeted protection against malware, and thus improve fields of malware protection in general, by providing a method for automatically identifying vulnerabilities of network-connected devices. Examples of the provided techniques improve a state of security of target computing devices (e.g., network-connected devices), potentially resulting in significant time and/or monetary savings. Thus, disclosed systems and methods may provide asset protection for common targets of malware, such as home networks, IoT networks, hospitals, shipping companies, financial companies, governments, etc.

Figure 2:
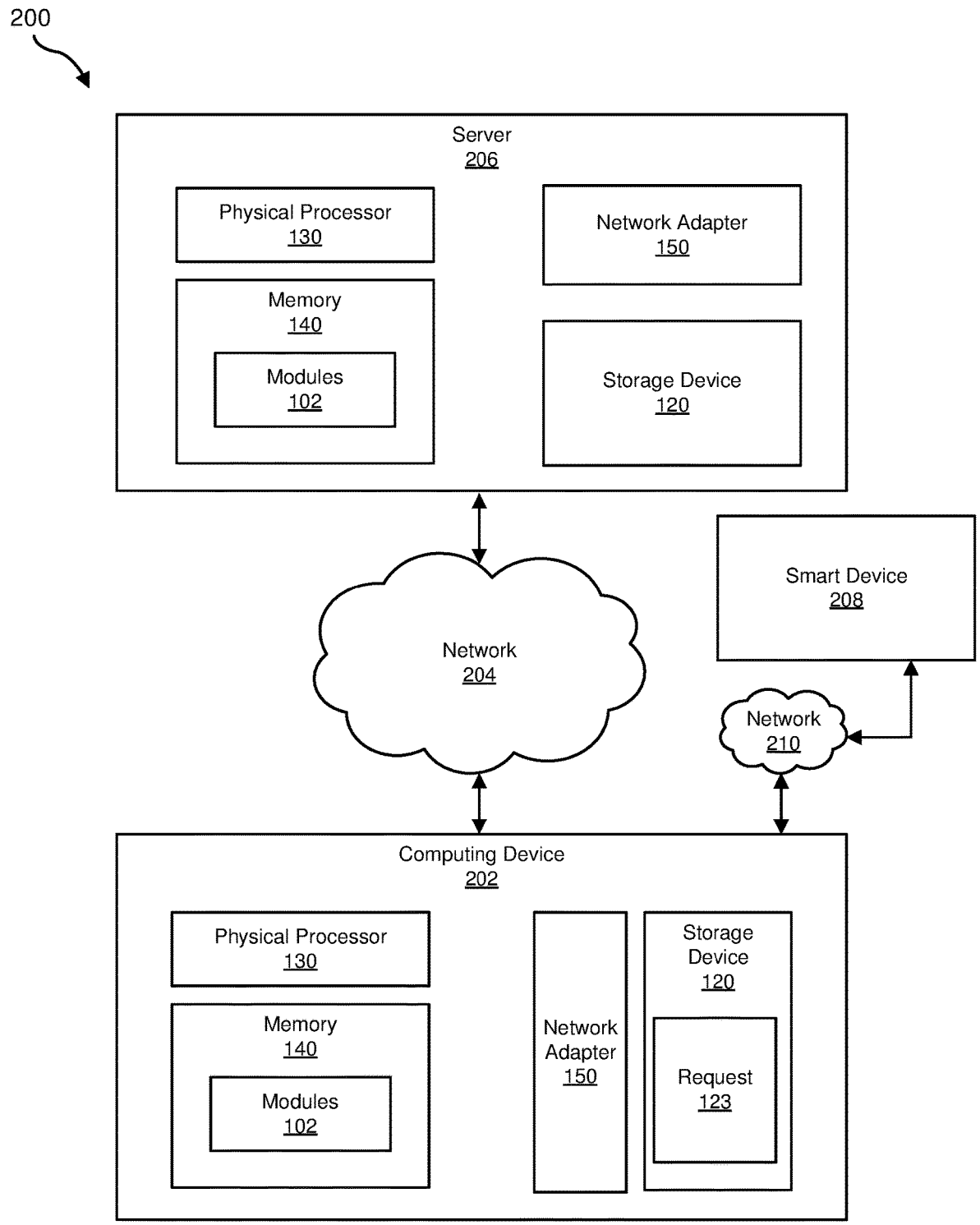
FIG. 2 is a block diagram of an additional example system for identifying potentially risky traffic destined for network-connected devices.
Figure 3:
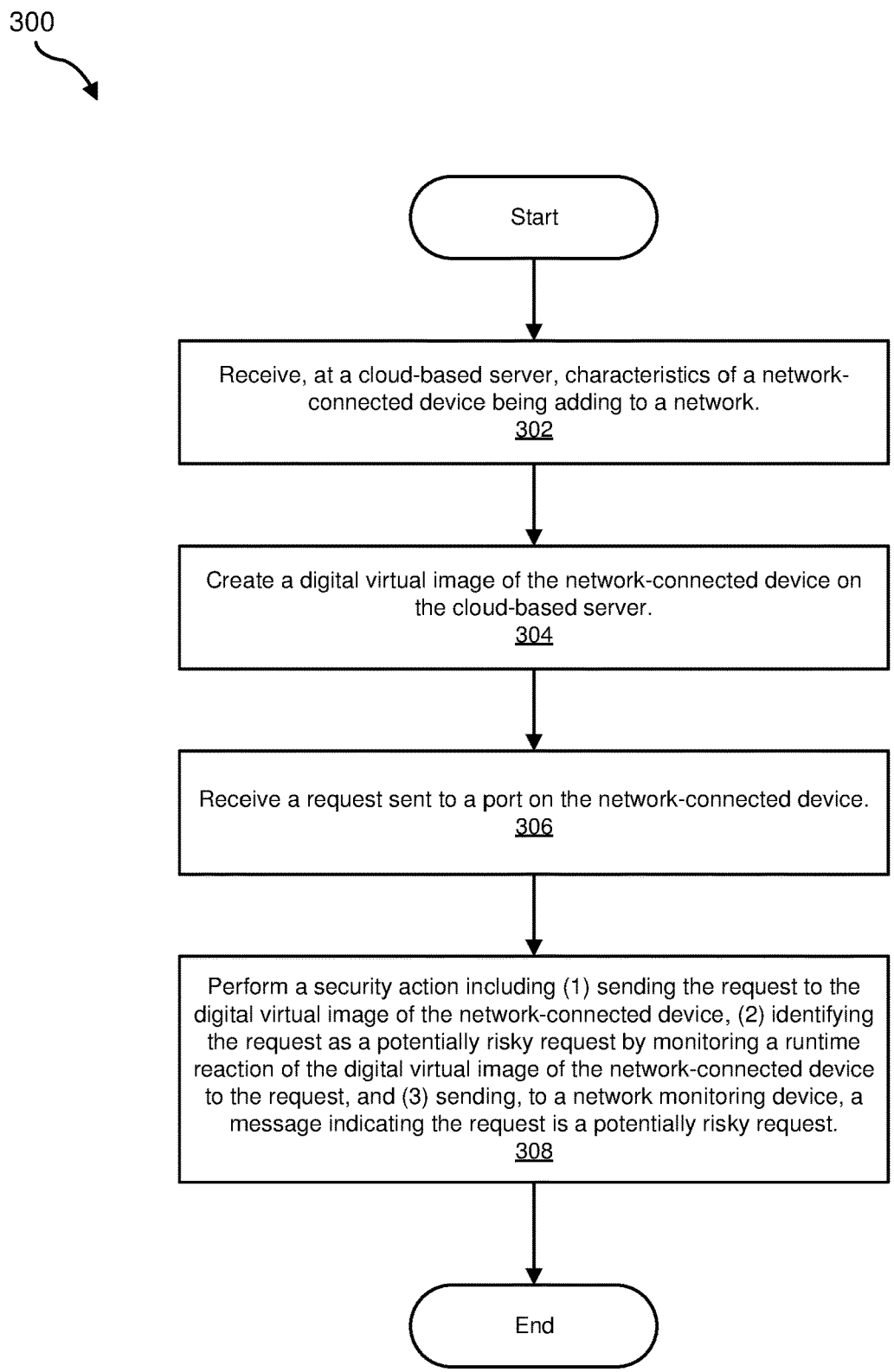
FIG. 3 is a flow diagram of an example method for identifying potentially risky traffic destined for network-connected devices.
Figure 4:
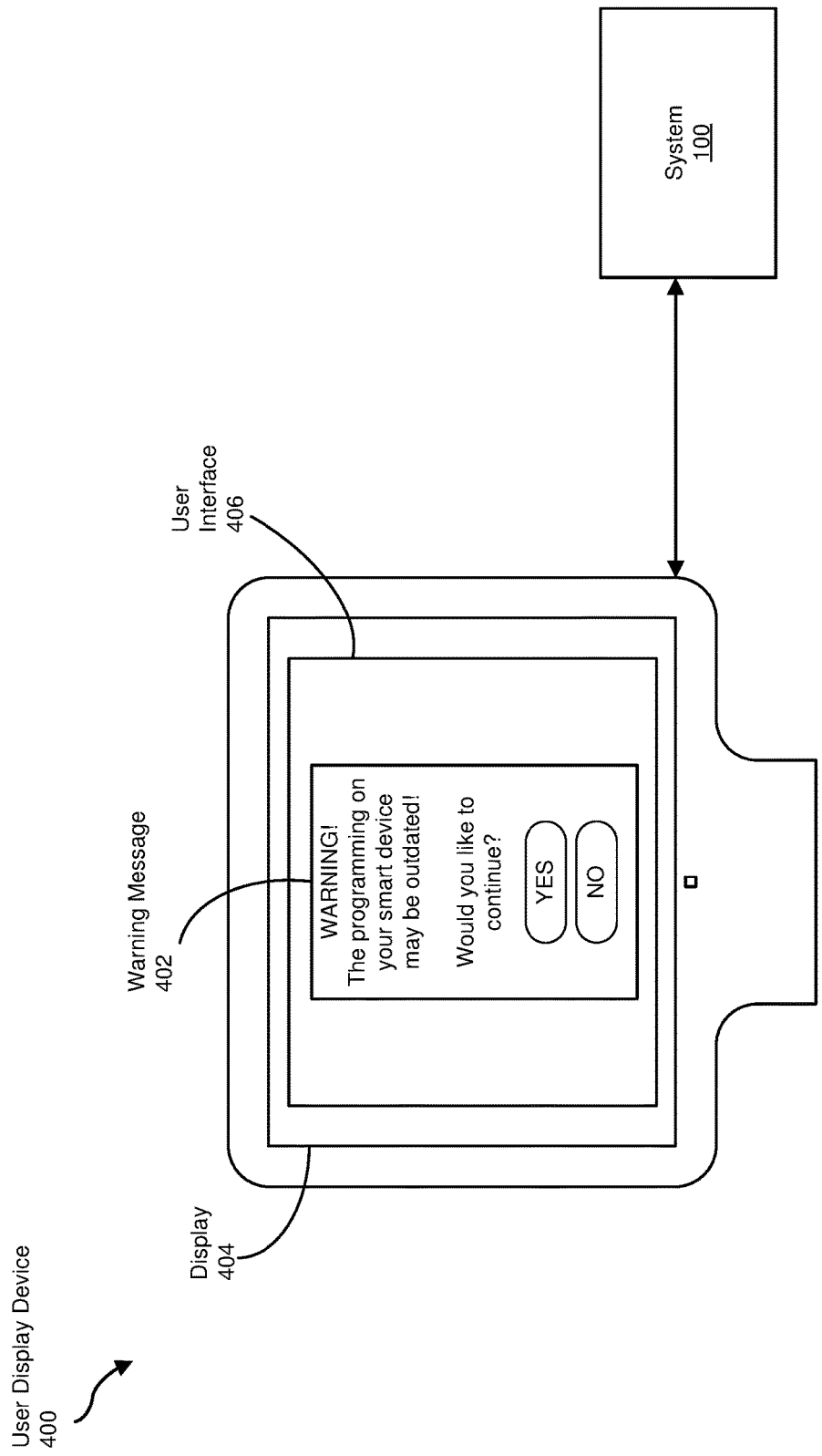
FIG. 4 is a block diagram of an example warning message on a user display device.

The following will provide, with reference to FIGS. 1-2 and 4, detailed descriptions of example systems for identifying potentially risky traffic destined for network-connected devices. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 5 and 6, respectively.

FIG. 1 is a block diagram of an example system 100 for identifying potentially risky traffic destined for network-connected devices. In some examples, system 100 may represent a router, such as a router in an Internet of Things (IOT) ad hoc network and/or a router configured to perform security actions to protect smart devices. As illustrated in this figure, example system 100 may include one or more modules 102 for performing one or more tasks. As will be explained in greater detail below, modules 102 may include a first receiving module 104, a creating module 106, a second receiving module 108, and a performing module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, server 206, and/or smart device 208). One or more of modules 102 in FIG. 1 may also represent all or portions of one or more special-purpose computers configured to perform one or more tasks.

As illustrated in FIG. 1, example system 100 may also include one or more tangible storage devices, such as storage device 120. Storage device 120 generally represents any type or form of volatile or non-volatile storage device or medium capable of storing data and/or computer-readable instructions. In one example, storage device 120 may store, load, and/or maintain information indicating one or more of characteristics of a network-connected device 121 (e.g., a smart device, an Internet of Things device, the like, or a combination thereof), a digital virtual image 122 of the network-connected device, a request 123 sent to (but not necessarily received by) the network-connected device, a security action 124, a potentially risky request 125, a runtime reaction 126 of a digital virtual image of the network-connected device to a request, and/or a message 127 indicating a request may be a potentially risky request. In some examples, storage device 120 may generally represent multiple storage devices. Examples of storage device 120 include, without limitation, Random Access Memory (RAM), Read Only Memory (ROM), flash memory, Hard Disk Drives (HDDs), Solid-State Drives (SSDs), optical disk drives, caches, a cloud-based storage device, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate identifying potentially risky traffic destined for network-connected devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more network adapters, such as network adapter 150. In some examples, network adapter 150 may be a physical network adapter connected to a physical network (e.g., network 204 in FIG. 2).

As illustrated in FIG. 1, example system 100 may also include one or more display devices, such as display 160. Display 160 generally represents any type or form of device capable of visually displaying information (e.g., to a user). In some examples, display 160 may present a graphical user interface. In non-limiting examples, display 160 may present at least a portion of characteristics of a network-connected device 121, digital virtual image 122, request 123, security action 124, runtime reaction 126, and/or message 127.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204, as well as a smart device via a network 210. In an example, network 204 and network 210 are the same network. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to identify potentially risky traffic destined for network-connected devices. For example, and as will be described in greater detail below, one or more of modules 102 may cause computing device 202 and/or server 206 to perform at least a portion of a method described hereby.

Computing device 202 generally represents any type or form of computing device capable of reading computer-executable instructions. In some examples, computing device 202 may represent a computer running security software, such as anti-malware software. Additional examples of computing device 202 include, without limitation, network monitoring devices, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device that is capable of reading computer-executable instructions. In some examples, server 206 may represent a computer running security software, such as anti-malware software. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another. In some examples, server 206 may be a cloud-based server.

Smart device 208 generally represents any type or form of everyday object that may be communicated with, read, located, recognized, addressed, and/or controlled by a computer network, such as an ad hoc network. Examples of smart device 208 include, without limitation, Internet of Things (IoT) devices; smart home appliances (televisions, refrigerators, dishwashers, hairdryers, etc.); smart heating, ventilation, and air conditioning (HVAC) devices, smart lighting devices (e.g., light bulbs, switches, etc.); smart utility meters; smart fire protection devices (e.g., smoke detectors, CO2 detectors, etc.); smart tools (e.g., drills, saws, etc.); smart containers; digital information processing devices; digital information display devices; digital information input devices; digital information communication devices; the like, or a combination thereof.

Network 210 generally represents any medium or architecture capable of facilitating communication or data transfer. In one example, network 204 may facilitate communication between computing device 202 and smart device 208. In this example, network 201 may facilitate communication or data transfer using wireless and/or wired connections. Examples of network 210 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), a Bluetooth network, an IoT network, an ad hoc network, portions of one or more of the same, variations or combinations of one or more of the same, and/or any other suitable network.

FIG. 3 is a flow diagram of an example computer-implemented method 300 for identifying potentially risky traffic destined for network-connected devices. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive (e.g., at a server such as a cloud-based server) characteristics of network-connected devices coupled to (e.g., being adding to) networks. The systems described herein may perform step 302 in a variety of ways. For example, first receiving module 104 may, as part of computing device 202 and/or server 206 in FIG. 2, receive at server 206 characteristics of smart device 208 being adding to network 210.

In some examples, the network-connected devices may be Internet-of-Things devices. In some embodiments, the networks may be at least in part Internet-of-Things networks.

In some embodiments, method 300 may include intercepting programming update packages destined for network-connected devices, unpacking the programming update packages to identify programming (e.g., software, firmware, etc.) that is present in the programming update packages, and/or identifying current and/or future characteristics of network-connected devices from the programming present in the programming update packages. In some embodiments, method 300 may include scanning open ports on the network, such as with a Network Mapper (NMAP) scan. In some examples, programming stored by the network-connected devices may be fingerprinted to (1) identify the programming of the network-connected devices and/or (2) profile the network-connected devices. In some examples, method 300 may include detecting, by network monitoring devices (e.g., computing device 202 in FIG. 2), the characteristics of the network-connected devices upon adding the network-connected devices to the networks and/or updating programming of the network-connected devices.

In some embodiments, method 300 may include detecting a type of computer-readable instructions stored on the network-connected device. In some embodiments, method 300 may include detecting a version identifier of the computer-readable instructions. In some examples, method 300 may include detecting a revision identifier of the computer-readable instructions. In some embodiments, method 300 may include sending the characteristics from the network monitoring device to the cloud-based server.

As illustrated in FIG. 3, at step 304 one or more of the systems described herein may create digital virtual images of the network-connected devices on the cloud-based servers. The systems described herein may perform step 304 in a variety of ways. For example, creating module 106 may, as part of computing device 202 and/or server 206 in FIG. 2, create digital virtual image 122 of smart device 208 on server 206.

In some examples, the digital virtual images may be created at least in part using the received characteristics of the network-connected devices. In some embodiments, digital virtual images of the network-connected devices may include the exact same type, version, and revision of programming stored by the network-connected devices, thus enabling the digital virtual images to act and react to inputs in the same manners as the network-connected devices.

In some examples, the digital virtual images of the network-connected devices may include at least some of the same computer-readable instructions stored on the network-connected devices. In some embodiments, the computer-readable instructions may be configured to monitor at least the ports on the network-connected devices.

In some embodiments, the digital virtual images of the network-connected device may include the same versions of the type of computer-readable instructions stored on the network-connected devices. In some examples, the digital virtual images of the network-connected device may include the same revisions of the type of computer-readable instructions stored on the network-connected devices.

In some embodiments, creating the digital virtual images of the network-connected devices at the cloud-based servers may include running firmware of the network-connected devices in virtual environments.

As illustrated in FIG. 3, at step 306 one or more of the systems described herein may receive requests sent to the network-connected devices (e.g., via ports on the network-connected devices). The systems described herein may perform step 306 in a variety of ways. For example, second receiving module 108 may, as part of computing device 202 and/or server 206 in FIG. 2, receive request 123 sent to smart device 208 (e.g., via a port on smart device 208).

In some examples, method 300 may include intercepting and quarantining, by the network monitoring devices, the requests sent to the ports on the network-connected devices. In some embodiments, method 300 may include sending the requests from the network monitoring devices to the cloud-based servers to enable testing the digital virtual images of the network-connected devices with the requests to determine how the digital virtual images of the network-connected devices respond to the requests. In some examples, the testing may be performed prior to letting the requests pass to the network-connected devices, while in some embodiments, the testing may be performed substantially simultaneously with the network-connected devices executing the requests. In some examples, the testing may be performed after the network-connected devices execute the requests.

In some embodiments, only selected requests may be sent to the cloud-based server for testing, such as to reduce network loading, processor loading, and/or costs. In some examples, selected requests may include requests originating from suspicious sources. Thus, in some embodiments, receiving the requests may be triggered by the requests originating from suspicious sources. In some examples, selected requests may include requests being novel (i.e., new and/or never before encountered) for types of the network-connected devices. Thus, in some examples, receiving the requests may be triggered by the requests being novel for types of the network-connected devices. In some embodiments, selected requests may include requests specifically targeting the network-connected devices (e.g., a request targeting a specific network-connected device). Thus, in some embodiments, receiving the requests may be triggered by the requests specifically targeting the network-connected devices.

To further protect the network-connected devices and the cloud-based servers, the characteristics of a network-connected device, the requests, or both may be encrypted while being communicated between the network-connected devices and the cloud-based servers. Encrypting the communications may reduce probabilities that the communications are intercepted and modified en route. Thus, in some embodiments, sending the requests and/or the characteristics of the network-connected devices (e.g., from the network-connected devices) may include encrypting the requests and/or the characteristics of the network-connected devices prior to sending. Further, in some embodiments, receiving the requests may include decrypting the requests and/or the characteristics of the network-connected devices (e.g., at the cloud-based servers) after receiving the requests and/or the characteristics of the network-connected devices. Moreover, in some examples, the network monitoring devices (e.g., computing device 202) may provide self-signed certificates as a substitute for a self-signed certificate provided by network-connected devices, to provide an additional level of security for the network-connected devices.

As illustrated in FIG. 3, at step 308 one or more of the systems described herein may perform security actions including (1) sending the requests to the digital virtual images of the network-connected devices, (2) identifying the requests as potentially risky requests by monitoring runtime reactions of the digital virtual images of the network-connected devices to the requests, and/or (3) sending, to network monitoring devices, message indicating the requests are potentially risky requests. The systems described herein may perform step 308 in a variety of ways. For example, performing module 110 may, as part of computing device 202 and/or server 206 in FIG. 2, perform security action 124 including (1) sending request 123 to digital virtual image 122 of smart device 208, (2) identify request 123 as potentially risky request 125 by monitoring runtime reaction 126 of digital virtual image 122 of smart device 208 to request 123, and/or (3) sending, to computing device 202, message 127 indicating request 123 is potentially risky request 125.

In some examples, the runtime reactions of the digital virtual images of the network-connected devices to the requests may include at least one of (1) service crashes, (2) service hangs, (3) returns of server error status codes (e.g., HyperText Transfer Protocol 5xx is returned), (4) redirections of network traffic to other devices (e.g., HyperText Transfer Protocol redirection to another Internet Protocol addressed device), and/or (5) unanticipated responses.

In some embodiments, the network monitoring devices may be network routers, IoT access points, IoT servers, any computing device configured to monitor and/or manage a network of network-connected devices, the like, or a combination thereof.

In one embodiment, method 300 may include resetting the digital virtual images of the network-connected devices following sending the messages. Resetting may clear residual information from prior tests from digital virtual images of the network-connected devices so that future tests are not tainted by the residual information.

In some embodiments, method 300 may include blocking the potentially risky requests from reaching at least one device in the networks, such as the network-connected devices. In some embodiments, method 300 may include quarantining the potentially risky requests to prevent the requests from reaching at least one device in the networks, such as the network-connected devices. In some examples, method 300 may include blocking future requests from attacking devices that sent the requests to prevent the future requests from reaching at least one device in the networks, such as the network-connected devices.

In examples, security actions may include prophylactic measures taken to safeguard electronic information prior to malicious activity (e.g., an attack). Prophylactic measures may include acts undertaken to prevent, detect, and/or mitigate vulnerabilities of electronic computing devices (e.g., smart devices, IoT devices, the like, or combinations thereof), to implement computer security policies (e.g., with vulnerability detecting engines), to detect malicious activities on electronic computing devices, and/or to thwart malicious activities on electronic computing devices.

In some examples, method 300 may further include performing at least one security action in response to detecting vulnerabilities of electronic computing devices (e.g., smart devices, IoT devices, the like, or combinations thereof), detecting potential security risks directed toward the electronic computing devices, detecting malicious activity directed toward the electronic computing devices, or a combination thereof. In some examples, security actions may be performed in an attempt to ameliorate potential security risks. For example, performing modules may identify potential security risks and in response performing modules may perform security actions in attempts to ameliorate the potential security risks. Security actions may include stopping acts by users and/or autonomous processes executing on computers.

Security actions may also include notifying users of potential security risks (e.g., via graphical user interfaces depicted on displays). In some examples, security actions may include preventing data entry into user interfaces and/or displaying warnings on user displays. In additional examples, the security actions may include displaying, on user displays, warnings indicating that the requests are potentially malicious, programming on the network-connected devices may be outdated, programming on the network-connected devices should be updated, or a combination thereof. FIG. 4 depicts an example of a user display device 400 including a display 404 (e.g., display 160) which may present a user interface 406 (e.g., a graphical user interface). In this non-limiting example, user display device 400 may display a warning message 402 as at least a part of security action 124 in response to identifying request 123 as potentially malicious, potentially risky request 125, or a combination thereof. The warning message depicted in FIG. 4 is non-limiting and any useful warning message may be provided.

As detailed herein, the steps outlined in method 300 in FIG. 3 and the systems of FIGS. 1-2 and 4 may enable computing devices to automatically perform runtime modelling of Internet-of-Things (IoT) devices at cloud-based servers to identify potentially risky network traffic destined for the IoT devices. In response to identifying vulnerabilities, security actions may be performed. By doing so, the systems and methods described herein may improve functioning of computing devices and/or provide targeted protection against malware, and thus improve fields of malware protection in general, by providing method for automatically identifying vulnerabilities of network-connected devices. Examples of the provided techniques improve a state of security of target computing devices (e.g., network-connected devices), potentially resulting in significant time and/or monetary savings. Thus, disclosed systems and methods may provide asset protection for common targets of malware, such as home networks, IoT networks, hospitals, shipping companies, financial companies, governments, etc.

Figure 5:
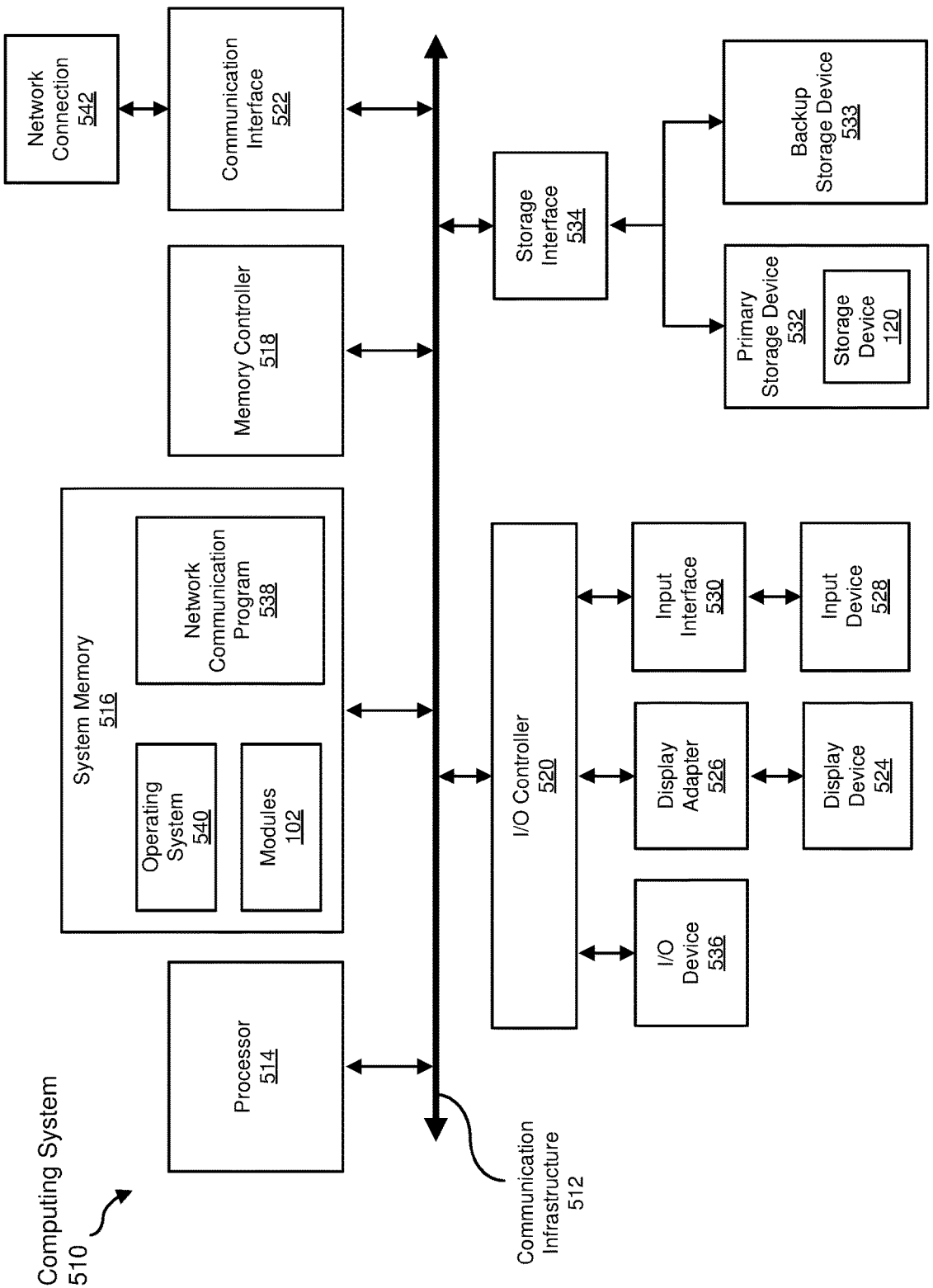
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, storage device 120 may be at least a part of primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
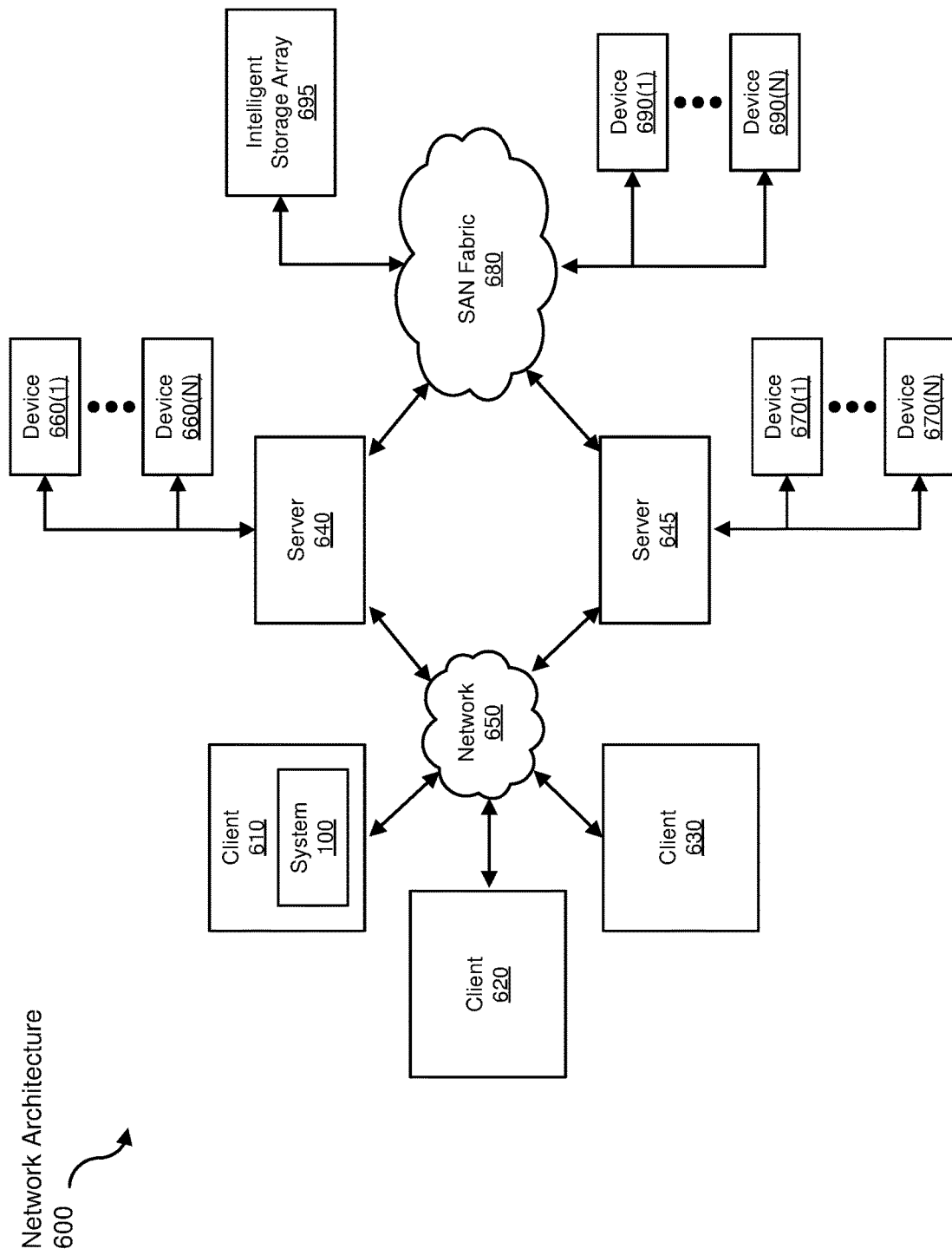
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for identifying potentially risky traffic destined for network-connected devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive characteristics of a network-connected device to be transformed, transform the characteristics of a network-connected device into digital virtual images of the network-connected devices, output a result of the transformation to displays, use the result of the transformation to identify vulnerabilities of network-connected devices, and store the result of the transformation to a digital information storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying potentially risky traffic destined for network-connected devices, at least a portion of the method being performed by a cloud-based server comprising at least one processor, the method comprising:

receiving, at the cloud-based server, characteristics of a network-connected device being added to a network;

creating, at the cloud-based server, a digital virtual image of the network-connected device;
intercepting and quarantining, by a network monitoring device, a request sent to a port on the network-connected device;
sending the request from the network monitoring device to the cloud-based server;
receiving, at the cloud-based server, the request; and
performing, at the cloud-based server, a security action comprising:
sending the request to the digital virtual image of the network-connected device;
identifying the request as a potentially risky request by monitoring a runtime reaction of the digital virtual image of the network-connected device to the request; and
sending, to the network monitoring device, a message indicating the request is a potentially risky request.

2. The computer-implemented method of claim 1, wherein the network-connected device is an Internet-of-Things device.

3. The computer-implemented method of claim 1, wherein the network is at least in part an Internet-of-Things network.

4. The computer-implemented method of claim 1, wherein the network monitoring device is a network router.

5. The computer-implemented method of claim 1, further comprising:
detecting, by the network monitoring device, the characteristics of the network-connected device upon adding the network-connected device to the network; and
sending the characteristics from the network monitoring device to the cloud-based server.

6. The computer-implemented method of claim 5, wherein detecting comprises:
scanning open ports on the network; and
detecting a type of computer-readable instructions stored on the network-connected device.

7. The computer-implemented method of claim 6, further comprising detecting a version identifier of the computer-readable instructions and a revision identifier of the computer-readable instructions.

8. The computer-implemented method of claim 1, wherein:
the digital virtual image of the network-connected device comprises at least some computer-readable instructions stored on the network-connected device; and
the computer-readable instructions are configured to monitor the port on the network-connected device.

9. The computer-implemented method of claim 8, wherein the digital virtual image of the network-connected device comprises a same version and revision of the computer-readable instructions stored on the network-connected device.

10. The computer-implemented method of claim 1, wherein creating the digital virtual image of the network-connected device at the cloud-based server comprises running firmware of the network-connected device in a virtual environment.

11. The computer-implemented method of claim 1, wherein receiving the request is triggered by at least one of:
the request originating from a suspicious source;
the request being novel for a type of the network-connected device; and
the request specifically targeting the network-connected device.

12. The computer-implemented method of claim 1, wherein receiving the request comprises decrypting the request.

13. The computer-implemented method of claim 1, wherein the runtime reaction of the digital virtual image of the network-connected device to the request comprises at least one of:
a service crash;
a service hang;
a return of a server error status code;
a redirection of network traffic to another device; and
an unanticipated response.

14. The computer-implemented method of claim 1, further comprising resetting the digital virtual image of the network-connected device following sending the message.

15. The computer-implemented method of claim 1, further comprising blocking the potentially risky request from reaching at least one device in the network.

16. A system for identifying potentially risky traffic destined for network-connected devices, the system comprising:
at least one physical processor at a cloud-based server; and
physical memory comprising computer-executable instructions that, when executed by the at least one physical processor, cause the at least one physical processor to:
receive, at the cloud-based server, characteristics of a network-connected device being added to a network;
create, at the cloud-based server, a digital virtual image of the network-connected device;
receive, from a network monitoring device, a request sent to a port on the network-connected device, wherein the network monitoring device intercepted and quarantined the request; and
perform a security action comprising:
sending the request to the digital virtual image of the network-connected device;
identifying the request as a potentially risky request by monitoring a runtime reaction of the digital virtual image of the network-connected device to the request; and
sending, to the network monitoring device, a message indicating the request is a potentially risky request.

17. The system of claim 16, wherein the network is at least in part an Internet-of-Things network.

18. The system of claim 16, further comprising computer-executable instructions that, when executed by the physical processor, cause the physical processor to block the potentially risky request from reaching at least one device in the network.

19. A non-transitory computer-readable medium comprising one or more computer-executable instructions that, when executed by at least one processor of a cloud-based server computing device, cause the computing device to:
receive, at the cloud-based server computing device, characteristics of a network-connected device being added to a network;
create, at the cloud-based server computing device, a digital virtual image of the network-connected device;
receive, from a network monitoring device, a request sent to a port on the network-connected device, wherein the network monitoring device intercepted and quarantined the request; and perform a security action comprising:
- sending the request to the digital virtual image of the network-connected device;
- identifying the request as a potentially risky request by monitoring a runtime reaction of the digital virtual image of the network-connected device to the request; and
- sending, to the network monitoring device, a message indicating the request is a potentially risky request.

20. The non-transitory computer-readable medium of claim 19, wherein the network is at least in part an Internet-of-Things network.

* * * * *